United States Patent [19]
Weinberg et al.

[11] Patent Number: 5,144,642
[45] Date of Patent: Sep. 1, 1992

[54] INTERFERENCE DETECTION AND CHARACTERIZATION METHOD AND APPARATUS

[75] Inventors: Aaron Weinberg, Potomac, Md.; Cunninghasm, Ken, Sterling, Va.; Daniel Urban, Silver Spring, Md.; Laurence Mailaender, Washington, D.C.

[73] Assignee: Stanford Telecommunications, Inc, Santa Clara, Calif.

[21] Appl. No.: 593,433

[22] Filed: Oct. 5, 1990

Related U.S. Application Data

[63] Continuation-in-part of Ser. No. 536,930, Jun. 7, 1990, abandoned.

[51] Int. Cl.[5] .......................... H04B 3/46; H04K 3/00
[52] U.S. Cl. ........................................ 375/10; 375/99; 455/226
[58] Field of Search .................. 375/1, 10, 99, 96; 455/1, 67, 226; 371/20.1; 342/173, 174, 165

[56] References Cited

U.S. PATENT DOCUMENTS

| | | | |
|---|---|---|---|
| 4,119,964 | 10/1978 | Johannsen et al. | 342/173 |
| 4,429,404 | 1/1984 | Mai | 375/76 |
| 4,805,189 | 2/1989 | Mahoney | 375/10 |
| 4,833,694 | 5/1989 | Young et al. | 375/96 |
| 4,920,543 | 4/2490 | Martin | 375/10 |

Primary Examiner—Benedict V. Safourek
Assistant Examiner—Ghebretinsae Temesghen
Attorney, Agent, or Firm—Zegeer, Jim

[57] ABSTRACT

The interference detection and characterization system of this invention supports modern communication systems which have to contend with a variety of intentional and unintentional interference souces. As an add-on to existing communications equipment, the invention employs novel signal processing techniques to automatically detect the presence of communications channel irregularities in near real-time and alert the attending operator. Information provided to the operator through a user-friendly interface is used to characterize the type of interference and its degree of severity. Once characterized, the information is used by the operator to take corrective actions including the activation of alternative communication plans or, in some instances, mitigation of the interference. Since output from the system of this invention lends itself well to expert system and neural network environments, such systems could be employed to further aid the operator. The unique interference signal measurements provided by the system makes it useful in applications well beyond those for which it was originally intended. Other uses for which the invention has shown great potential include bit error rate estimators, communication channel scanners, and as laboratory test equipment to support receiver development and performance verification.

12 Claims, 12 Drawing Sheets

FIGURE 3A    I-CHANNEL SPECTRUM

FIGURE 3D    Q-CHANNEL SPECTRUM

FIGURE 3B    I-CHANNEL CORRELATION

FIGURE 3E    Q-CHANNEL CORRELATION

FIGURE 3C  I-CHANNEL HISTOGRAM

FIGURE 3F  Q-CHANNEL HISTOGRAM

FIGURE 4A  I-CHANNEL SPECTRUM

FIGURE 4D  Q-CHANNEL SPECTRUM

FIGURE 4B   I-CHANNEL CORRELATION

FIGURE 4E   Q-CHANNEL CORRELATION

FIGURE 4C  I-CHANNEL HISTOGRAM

FIGURE 4F  Q-CHANNEL HISTOGRAM

INTERFERENCE DETECTION AND CHARACTERIZATION METHOD AND APPARATUS

REFERENCE TO RELATED APPLICATIONS

This application is a continuation-in-part of U.S. application Ser. No. 07/536,930, filed Jun. 7, 1990 entitled "INTERFERENCE DETECTION AND CHARACTERIZATION METHOD AND APPARATUS", now abandoned.

BACKGROUND OF THE INVENTION

Modern communication systems, particularly military, have to contend with a variety of intentional and unintentional interference sources. Research into methods of contending with these sources of disruption has led to the development of the Interference Detection and Characterization (IDAC) system of this invention. The invention may be implemented via compact, state-of-the-art technology and serve as an add-on unit to existing communications equipment. With its ability to rapidly detect the presence of interference and to isolate signal signatures for characterization, the IDAC system has proven itself to be a valuable tool which provides communications channel monitoring capabilities that until now were not available.

Previous methods used to perform functions similar to those of this invention:

Communications channel monitoring has historically relied on the use of spectrum analyzers to observe RF characteristics within a transmission band. This has provided observers with only coarse information about the transmission band's content since the spectrum analyzer provides a simple magnitude measure of signal power. Because of this, only interference sources with power levels comparable (or stronger) to those of the desired signal could be observed, and even then only very basic information could be gleened as to the type of interferer and its characteristics. In the case of subtle interference, those which could cause a degradation in the bit error rate without causing a loss of receiver lock, the spectrum analyzer would fail to detect its presence since the interferer's power would be buried inside the envelope of the desired signal's power spectrum. Hence, the spectrum analyzer could offer only limited support to the detection and characterization process.

IDAC may be used with new or existing equipment in many ways. In cases where lost systems are sealed and desired signals unavailable, IDAC may be fabricated with its own receiver element to provide proper signal synchronization. This approach would simply require the use of a common IF or RF in order to monitor the desired channel. When new equipment is to be built or existing equipment can be modified, the IDAC architecture can use available signals from that receiver thereby reducing IDAC to a set of processors. The following description deals with the more extreme case where an IDAC receiver must be supplied but both cases are valid under this application.

THE PRESENT INVENTION

Unlike the spectrum analyzer, the system of this invention processes data containing amplitude, phase, and frequency information that has been coherently extracted from a desired signal's demodulated data. The invention takes advantage of this information and thus, is many orders of magnitude more sensitive than a spectrum analyzer in assessing the content of received signals.

The invention contains its own receiver circuitry to down convert, demodulate, and synchronize to the received waveform. This signal is further processed via a unique combination of three simultaneous processors to yield so-called signal signature information. This hardware generated data is provided to a computer (possibly employing a nural network or expert system) which may alert an operator to the presence of non-nominal channel conditions. Degradations may be due to intentional or unintentional interference, channel fading, or equipment malfunction. This invention then provides: interference detection alarm, pseudo error rate estimator of bit error rate, channel quality estimation (including jammer effects), characteristics or type of interfering waveform, and recommended operator countermeasures.

The interference detection and characterization system of this invention provides a wealth of information which was never exploited until now. The following are new and innovative features provided by the system of this invention:

1. Interference detection and characterization of both subtle and brute force jammers. By using the fundamental signal variables of amplitude, time and frequency, the interference detection and characterization system of this invention is able to "box in" jammers by allowing them no physical parameter to alter without being detected. Judicious use of metrics developed by this invention to monitor these physical parameters enables the invention to characterize the type of interference present.

2. Interference mitigation is possible for some jammer types once they have been fully characterized. By doing this, the effects of the interference can be removed and a signal equivalent to the noncorrupted version recovered.

BRIEF DESCRIPTION OF THE DRAWINGS

The above and other objects, advantages and features of the invention will become more apparent from the following description of the invention embodying the invention considered with the accompanying drawings wherein.

DETAILED DESCRIPTION OF THE INVENTION

Figure 1:
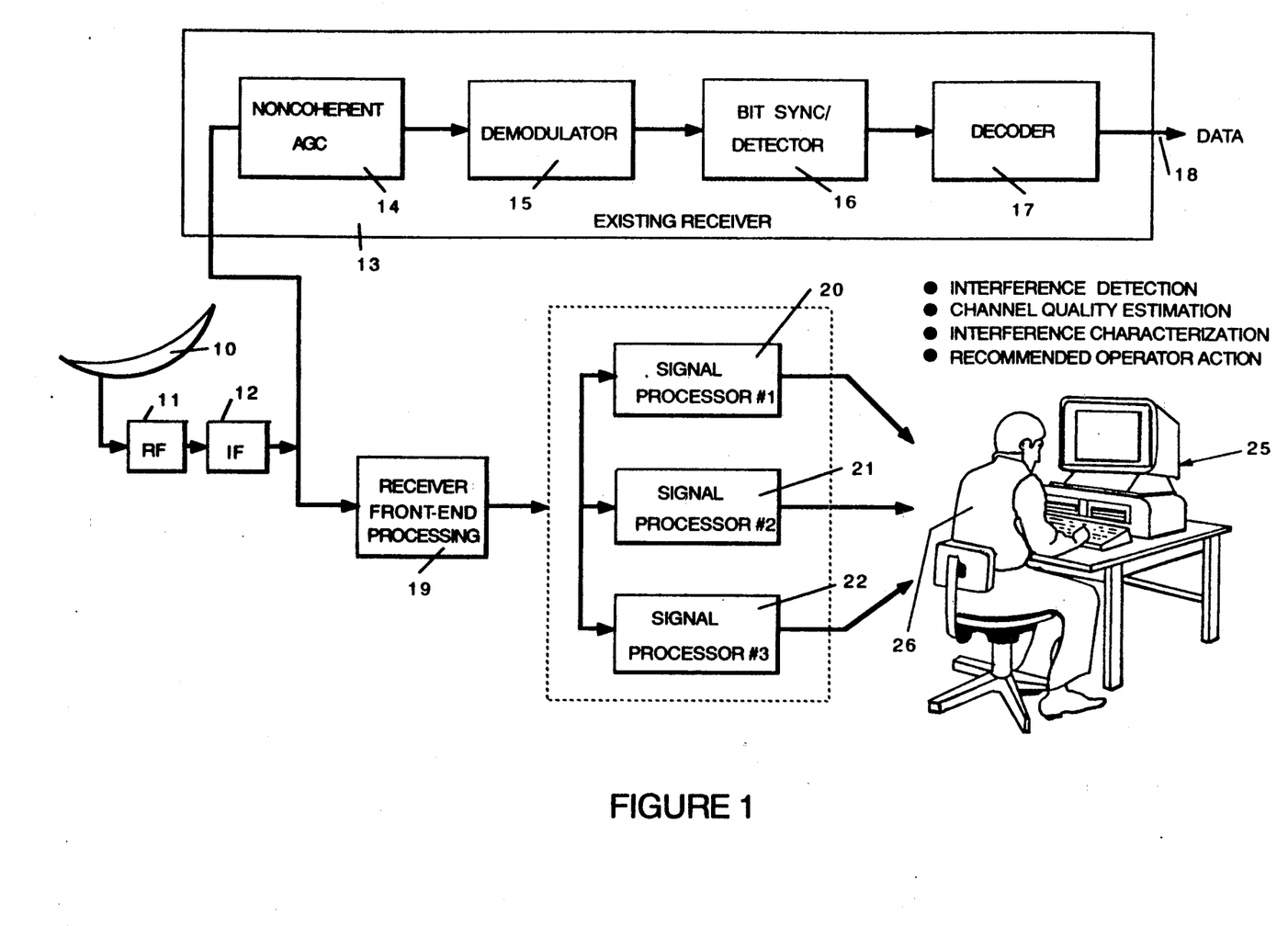
FIG. 1 is a broad overview generic block diagram of a receiver system illustrating a non-invasive configuration of the invention.

Referring to the block diagram shown in FIG. 1, antenna 10, RF section 11 and IF section 12 may be part of an existing receiver 13, comprising a non-coherent AGC circuit 14 supplying, in turn, a demodulator 15, bit sync/detector 16 and decoder 17 to produce communication data signals on an output 18. In this embodiment of the invention, the unit utilizes a common antenna 10, RF section 11 and IF section 12, but the system could be provided with its own antenna and a separate front end. The IDAC system includes a receiver front-end processing unit 19 to down convert, demodulate and synchronize the received waveform.

The signal from front-end processor 19 is further processed by three simultaneous signal processors 20, 21 and 22, which yield data containing amplitude, phase and frequency information that has been coherently extracted from the received waveform and constitute the signal signature information. The output amplitude information, phase information and frequency information are supplied to computer 25 (possibly employing a nural network or an expert system) which provides a man-machine interface and alert operator 26 to the presence of non-nominal channel conditions. Degradations may be due to intentional or unintentional interference, channel fading, or equipment malfunction. The invention then provides an alarm indicating detection of interference, channel quality estimation (including jammer effects), characterizations or type of interfering waveform and recommended operator countermeasures. The expert system may create and utilize a database of jammer waveforms for use in detection and characterization.

Figure 2:
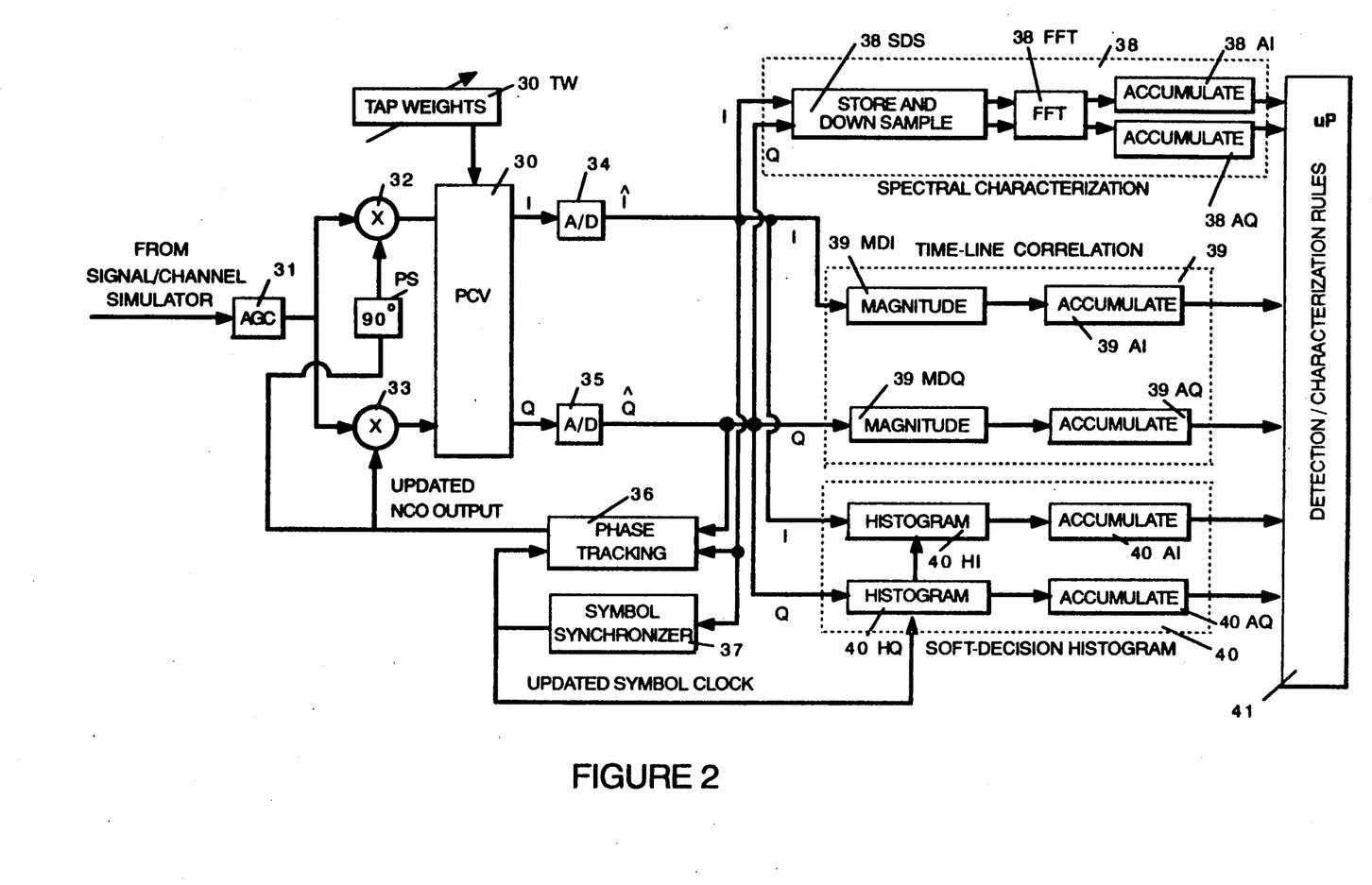
FIG. 2 is a more detailed functional block diagram of an IDAC system incorporating the invention, FIGS. 3 a, b, c, d, e and f are diagrams of the signal signatures, with no jamming, for illustrating the present invention, FIGS. 4 a, b, c, d, e, and f are diagrams of the signal signatures, with jamming (a subtle tone jamming on the channel) for illustrating the present invention.
Figure 3A:
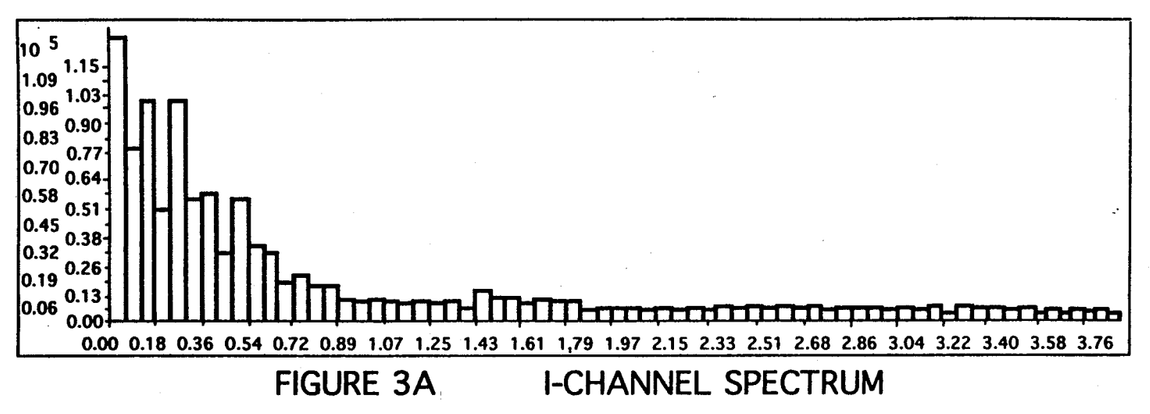
Figure 3B:
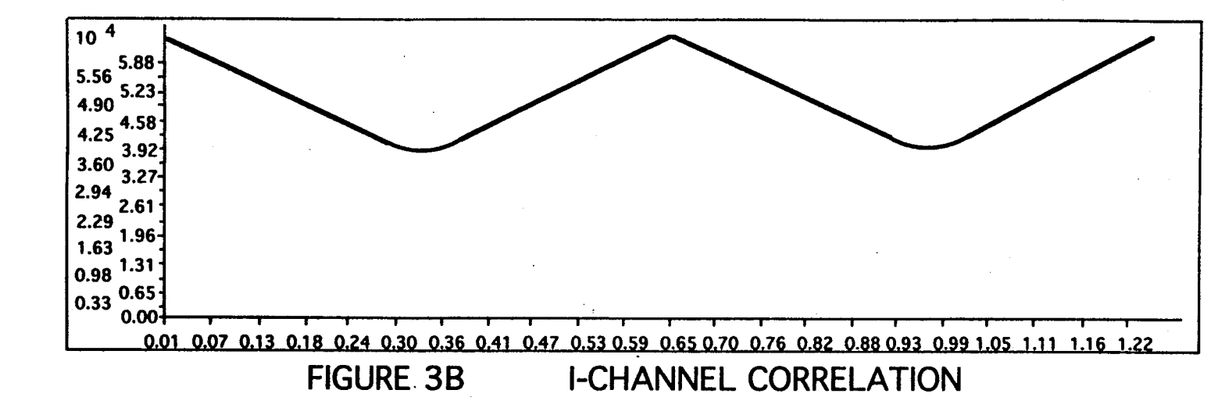
Figure 3C:
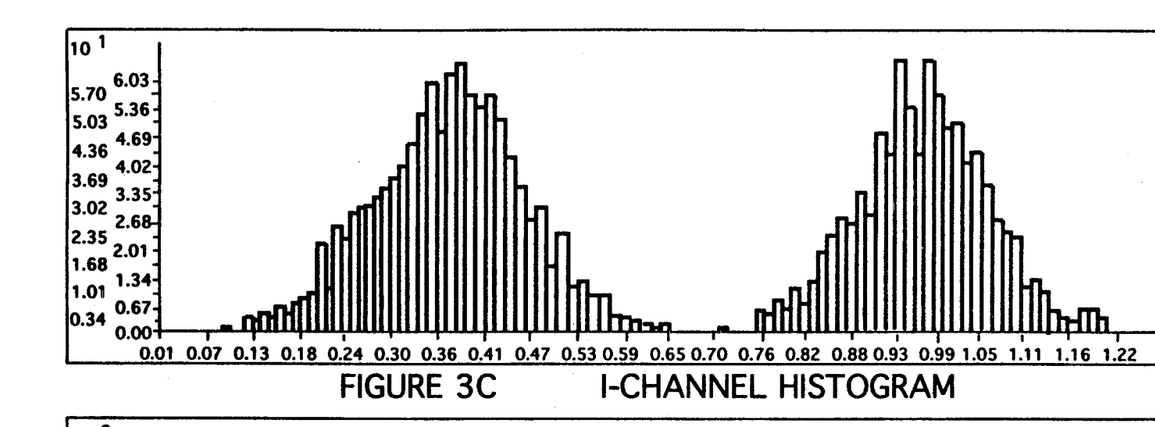
Figure 3D:
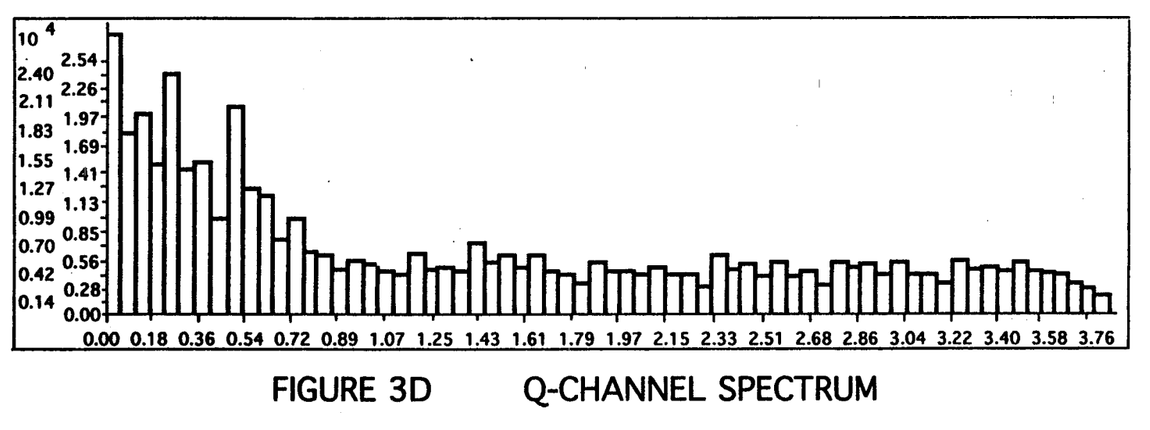
Figure 3E:
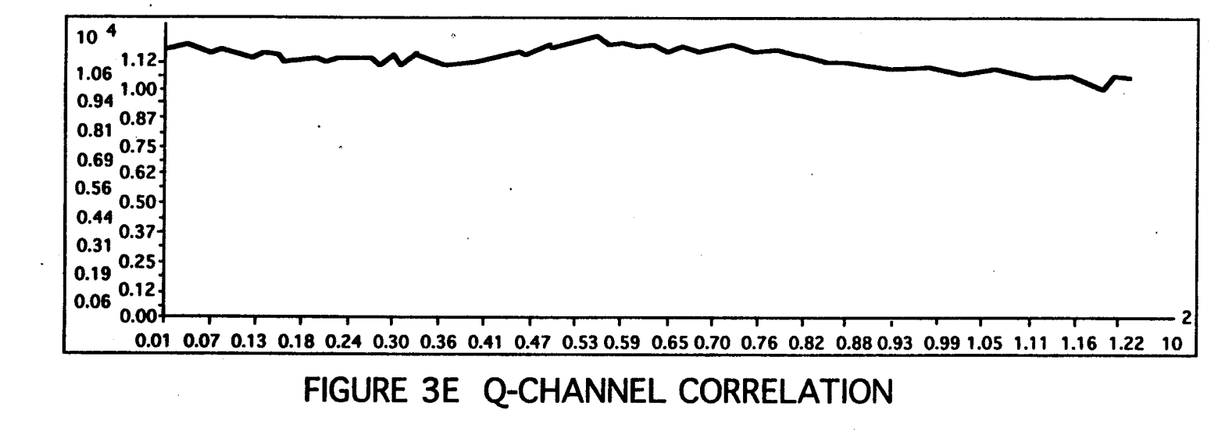
Figure 3F:
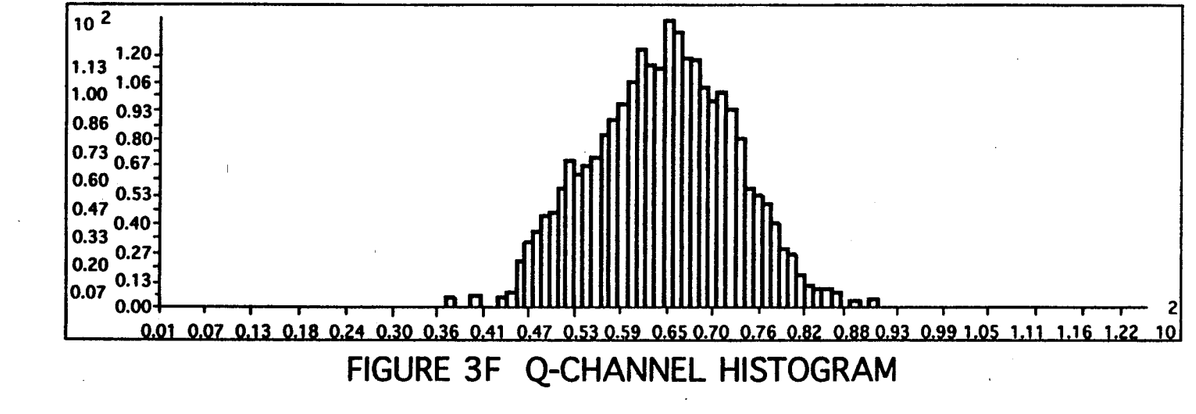
Figure 4A:
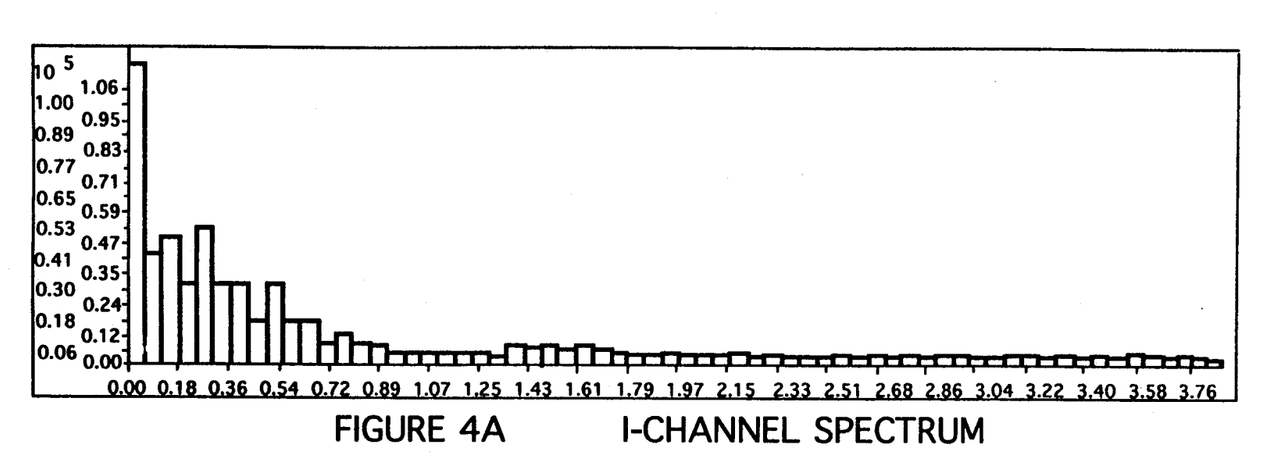
Figure 4B:
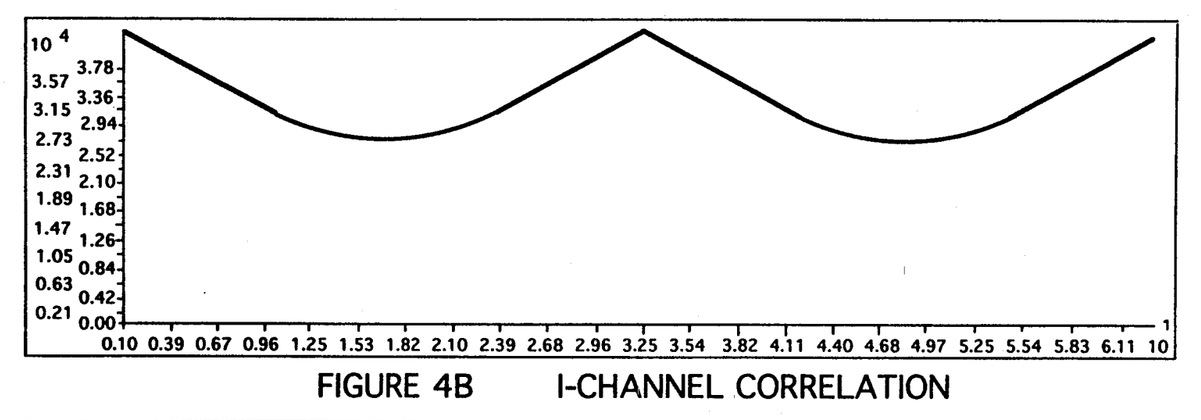
Figure 4C:
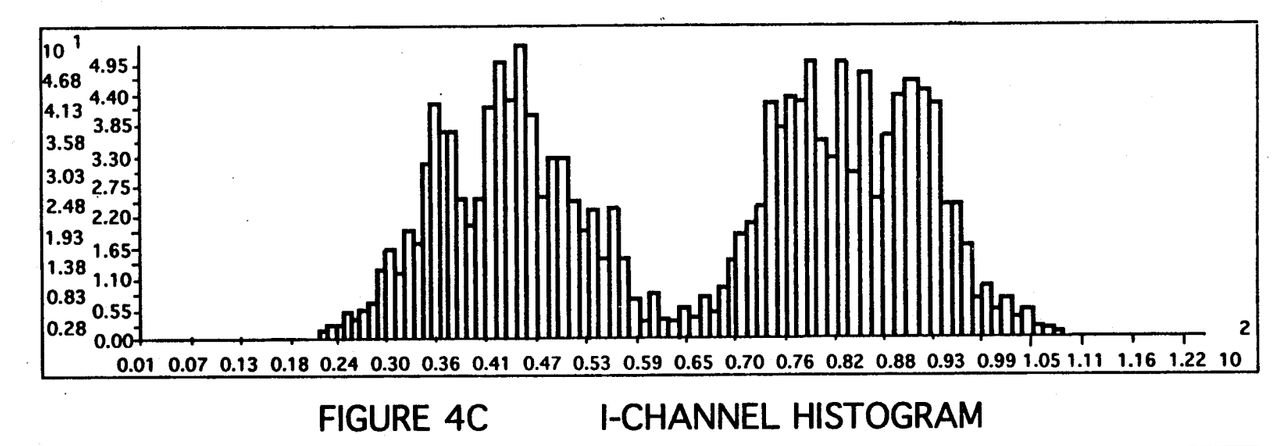
Figure 4D:
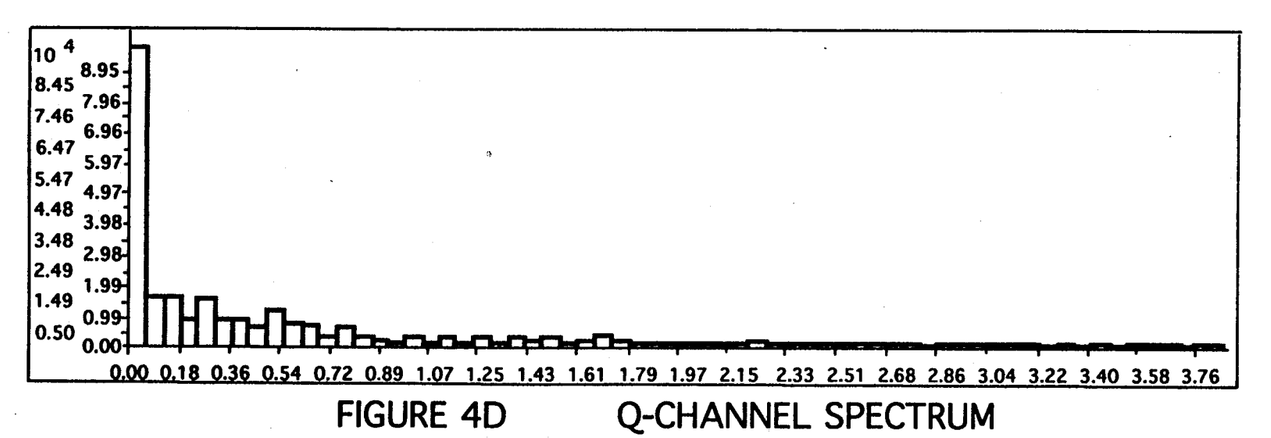
Figure 4E:
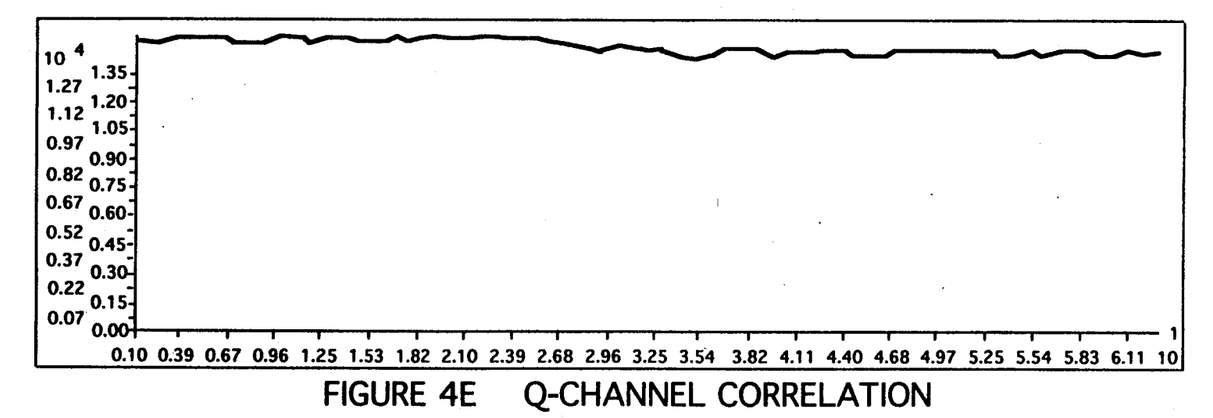
Figure 4F:
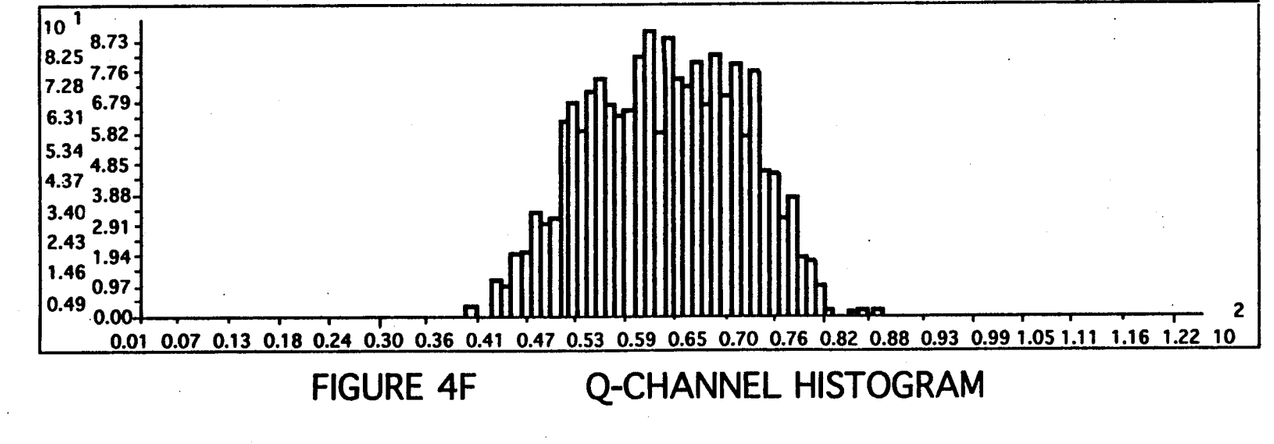

A more detailed block diagram of the IDAC signal processing for a BPSK signal is provided in FIG. 2. A feature of the system is the dual-channel programmable convolver (PCV) 30 which is in the preferred embodiment and is constituted by a single charge-coupled device (CCD) chip. The signals from the PCV 30 provide the basis for all the subsequent processing. While the CCD is preferred because of its inherit flexibility any matched filtering approach may be used.

As seen in FIG. 2, the received BPSK signal from front-end processor 19 is processed by an automatic gain control (AGC) 31 and mixed in mixers 32, 33 to baseband in I- and Q-channels, respectively. These signals are applied as inputs to the dual channel programmable resolver 30, which may implement programmable data matched filtering for the data rate of interest. Tap weights for the programmable CCD detector system 30 are provided via unit 30TW or may be from a microprocessor.

The programmable CCD detector or convolver 30 outputs "I" and "Q" are digitized by analog-to-digital A/D converters 34, 35 and the digitized outputs are processed by three separate algorithms for 1) spectral characterization in spectral characterization circuit 38, 2) time line correlation in circuit 39 and 3) soft-decision histogram in amplitude analysis circuit 40. These three algorithms operate simultaneously. These algorithms produce the signatures, each of which offers a uniquely sensitive interpretation of the received signal characteristics. The signatures consist of FFT (Fast Fourier Transform) for each of the channels to provide a spectral characterization, time-line correlation, and amplitude histogram data from the PCV outputs. This information, when handed to the computer 41, becomes the basis for rapid interference detection and characterization according to this invention. Also shown in FIG. 2 are the internal carrier tracking via phase tracking unit 36 and symbol synchronization functions by symbol synchronizer 37 which are provided to allow stand-alone operation (e.g., no signal tap points in the existing communications gear are required). Alternatively, if tap points and received symbol clocks are available in existing communication equipment, they can be used and eliminate the separate demod/bitsync circuitry.

With regard to the spectral characterization module 38, the digitized I and Q signals are stored and down sampled in 38SDS and a fast Fourier transform performed in 38FFT on each channel (I and Q) and the outputs thereof are accounted in accumulator 38AI and 38AQ. With regard to the time-line correlations, the digitized I and Q signals have their amplitude magnitudes calculated in 39MDI and 39MDQ, accumulated in accumulator 39AI and 39AQ. In a similar manner, signal phase or timing variations are detected on 40HI and 40HQ, and accumulated in accumulator 40AQ and 40AI. The outputs of these accumulators are supplied to microprocessor 41. In a modification described later herein, the microprocessor can themselves be programmed to perform the function of spectral, amplitude and phase and frequency variation detection.

Interference detection and characterization signatures produced by the signal processing according to the invention are illustrative in FIGS. 3 and 4. Each figure consists of the I-channel information on the left (FIGS. 3a, 3b, 3c and FIGS. 4a, 4b and 4c), and the Q-channel on the right (FIGS. 3d, 3e and 3f and FIGS. 4d, 4e and 4f). Each of the three signatures are then displayed as a vertical group. The top row (FIGS. 3a, 4b and 4a, 4d) shows the spectral signature which represents received power versus frequency. The middle row (FIGS. 3b and 3e, 4b and 4e) is the correlation function versus offset time. The bottom row (FIGS. 3c, 3f and 4c, 4f) is the histogram signature of occurrence versus amplitude These three signatures play a key role in the detection/characterization process of this invention.

In FIG. 3, the signatures are generated for an input BPSK signal at $E_b/N_o = 10$ dB with no interference. These signatures describe the "nominal" or "expected" channel conditions. Significant variation from these nominal responses indicate the presence of interference, and specific variations can be traced to specific interference types. Note particularly that the spectral signature exhibits a smooth $\text{sinc}^2$ roll-off, and that the triangular correlation function histograms show Gaussian bell-shaped curves.

When a subtle tone jammer appears on the channel, the signatures of FIGS. 4a-f are produced. In this case, the tone jammer has a power level 6 dB below the desired signal, and a frequency nearly coincident with the desired carrier. Significant changes are apparent in FIGS. 4a-f. The spectral signatures show a significant power increase in the first frequency bin (at the carrier frequency), and the histograms show a "flattened" characteristic. These changes can be recognized by this invention and the operator alerted. The expert system can then deduce the jammer type, frequency, and power level, if desired.

Figure 5A:
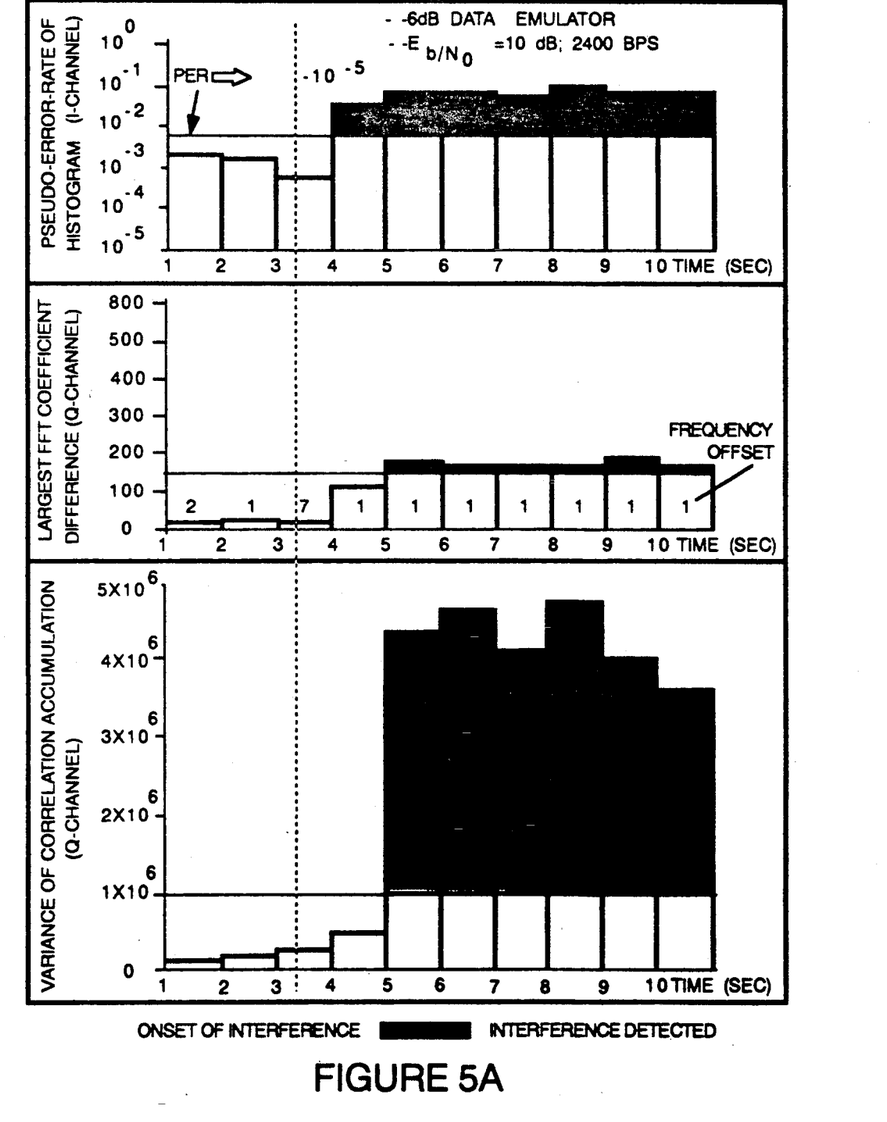
FIGS. 5a and 5b are sets of plots of detection metrics vs time and illustrate detection time lines, FIGS. 6a, b, c and d are diagrammatic illustrations of jammer characterizations based on detection metrics.
Figure 5B:
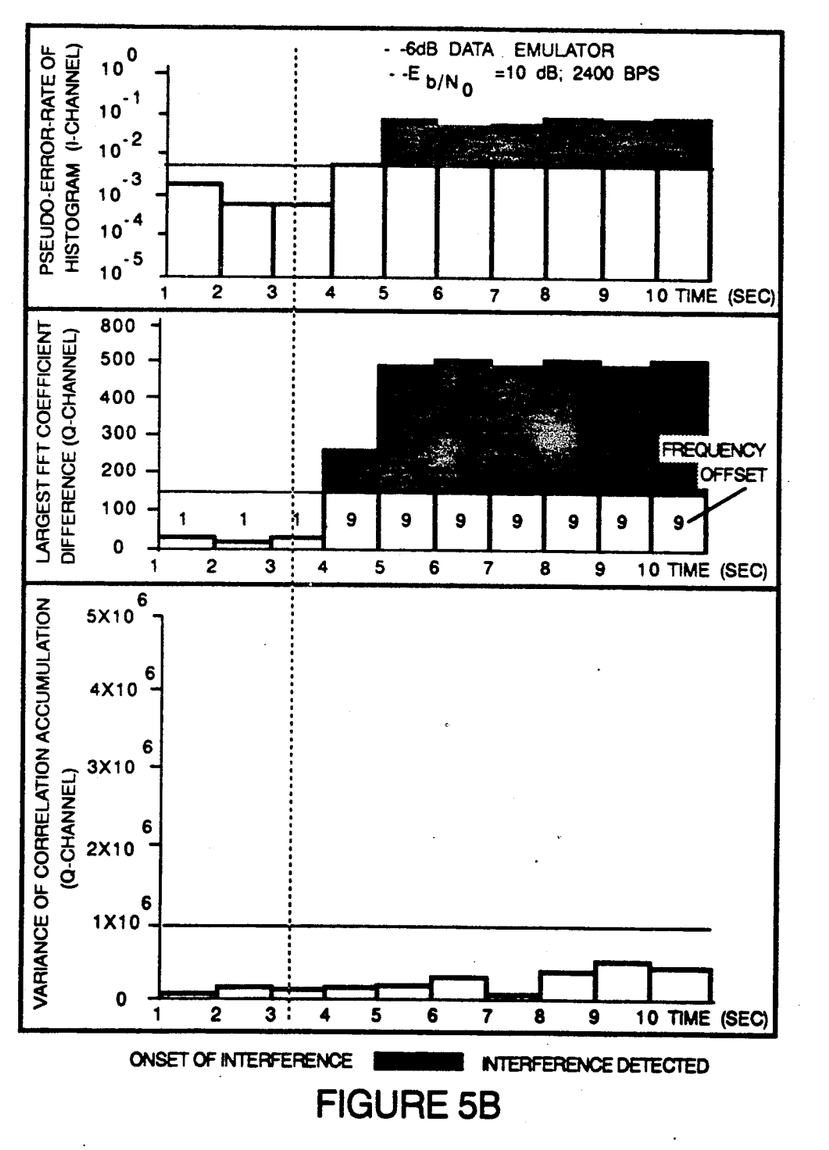

A processing time equal to the period of only several hundred data symbols is required to accumulate reliable signature data. Rapid jammer detection is a capability and feature of the invention. The time response to sudden jammer presence is seen in the simulated data of FIGS. 5a and 5b which are plots of the detection metrics versus time. Each metric is a measured difference between the received signature and its "nominal" counterpart. A jammer is introduced to the channel at about 3.5 seconds, as denoted by the vertical dashed line for each of the two cases presented. In Case 1 (FIG. 5a), a data emulator jammer (random BPSK source) appears on the channel and is rapidly detected. Detection occurs when any metric exceeds its threshold value (the darkened portion of the bar chart). Note that in this case the histogram and especially the correlation function metrics are responsible for the detection. In Case 2 (FIG. 5b), a tone jammer is introduced to the channel at 3.5 seconds and is also rapidly detected. In this case, the histogram and spectral metrics are the most affected. In both cases, jammer detection by this invention requires less than 2 seconds, however, greater or lower detection times are possible.

Figure 6:
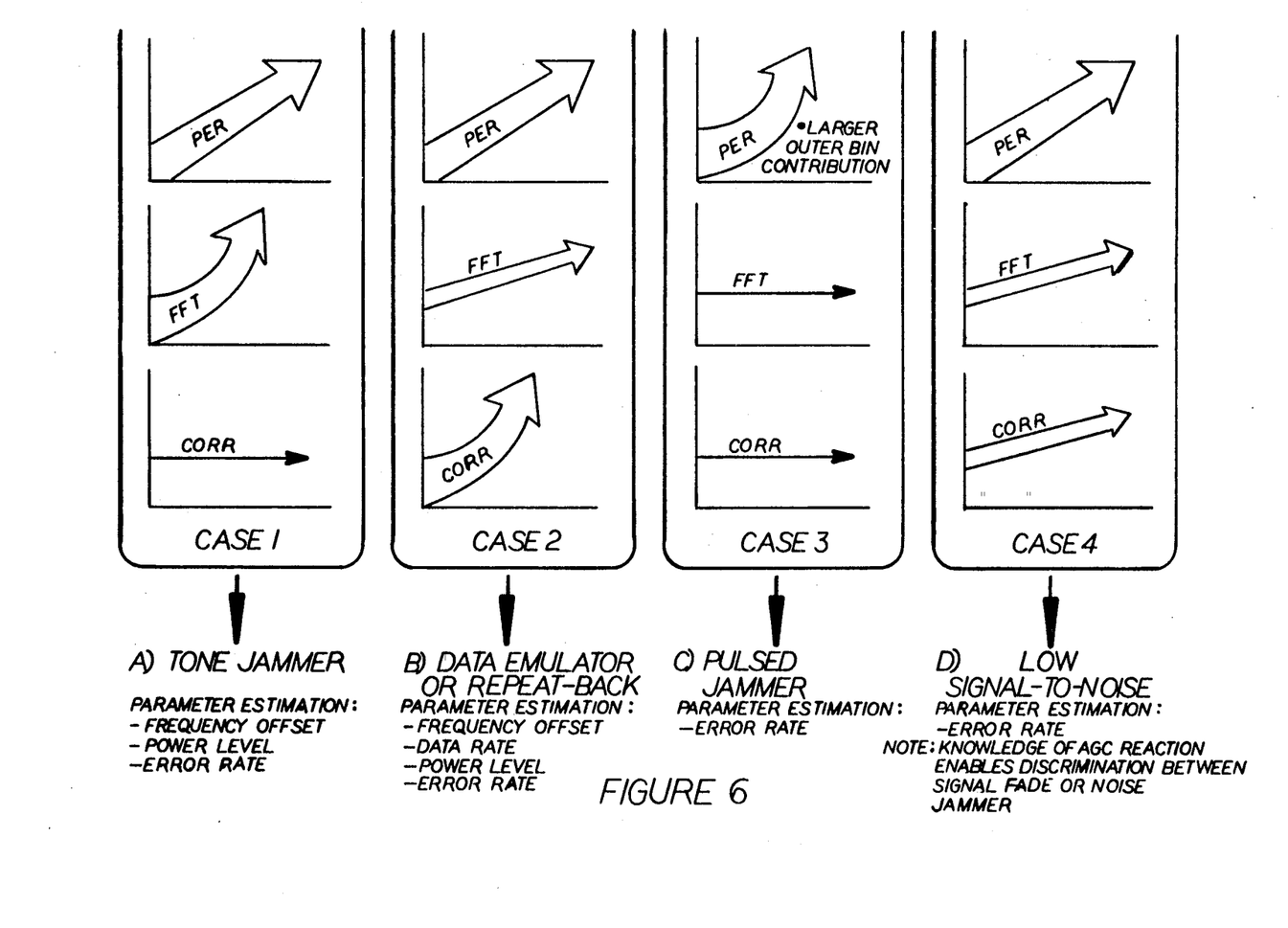

Preliminary jammer characterization can be accomplished by mapping the degree of distortion in each metric to the unique jammer types. As seen in FIGS. 6a, b, c, and d, increased distortion is presented as an increasingly sloped arrow. This results in a unique mapping to a jammer type. If further characterization procedures are performed by the expert systems or neural network, the additional information at the bottom of the figure can be deduced for each jammer type.

The signal generation and channel emulation capabilities (FIG. 7) are required to provide signals for laboratory tests. They have the ability to emulate various kinds of interference: generate tone, pulsed tone, and data emulator jammers over a wide range of jammer-to-signal and signal-to-noise ratios. The model performs carrier and symbol tracking operations on the composite IF provided by the signal generator to properly recover the embedded baseband information. Receiver operations are directed by a personal computer under operator control. The three signal processor modules (correlation, spectral, and histogram) required by the invention to detect and characterize interference reside within the model and extract the signatures specified above.

Figure 7:
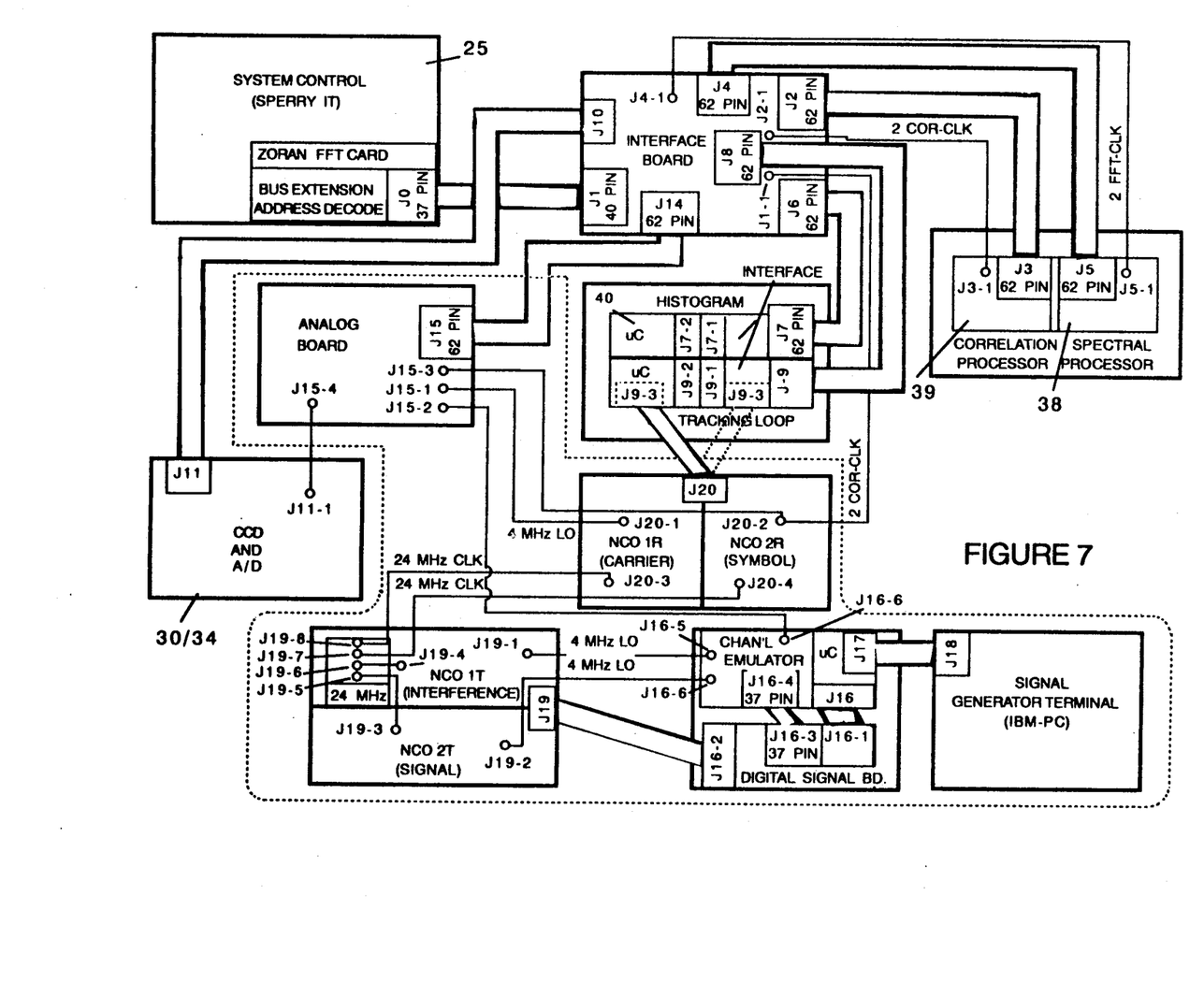
FIG. 7 is an illustration showing the manner in which hardware modules are organized with the closed-loop configuration.

The system architecture employed herein uses distributed signal processing. The system uses a modular design approach for both hardware and software. The three basic functions of the hardware implementation with simulated jamming have been further divided into modules which perform the specific tasks within the system. These modules may be grouped for packaging on 11.5"×14" cards. FIG. 7 illustrates the manner in which the modules have been organized. That which is surrounded by dashed lines emulate receiver circuitry and various interferences or jamming.

Accurate bit error rate (BER) estimation through data processing of the amplitude histogram information is possible. This technique precludes the need to know prior information about the received symbol sequence and allows accurate BER estimation to be performed at sites which are not collocated with the transmitter.

The interference detection and characterization, as a receiver development test device, provides unique insight to receiver performance by detecting a multitude of design faults which have not been easily observed in the past with conventional test equipment. Faults which can be easily detected by this invention include undesired harmonic spurs within the data's spectral envelope, tracking loop slippage, voltage biases, gain and phase imbalances and date asymmetry.

The embodiment disclosed herein employs custom designs built from discrete logic for each of the three metrics (amplitude, time and frequency). It is obvious that a different approach could employ the use of gate arrays or ASICs to reduce size and power consumption. Another alternative, which will become more attractive as microprocessor speeds increase, involves the use of high speed memory banks to store the A/D data. Using the tracking loop clocks to time the storage process, the memory banks could collect the appropriate A/D output. Once a bank was filled, microprocessors could be used to manipulate the data through software control in the same manner as customized metric processors would. This approach would further reduce system resource requirements and facilitate system customization for specific applications.

Other aspects of the invention that can be adapted to meet specific user needs include the use of A/D data directly from the user's receiver rather than that of the tracking loops of this invention. This would provide the user with direct insight to his receiver's performance as well as detect and characterize interference on the receiver's channel. Additionally, the system of this invention could be extended to monitor multiple channels simultaneously and to handle time division multiplexed operation. Finally, while the disclosure herein has been directed at PSK modulation, the basic principles of this invention are directly applicable to many other signal structures and modulation types and the system architecture could be modified to accommodate them.

While there has been disclosed a preferred embodiment of the invention and several modifications and alternative embodiments referred to, it will be appreciated that various other embodiments and modifications will be apparent to those skilled in the art and be within the spirit and scope of the invention.

What is claimed is:

1. An interference detection system comprising:
   receiver means for down converting, demodulating and synchronizing a received waveform to produce a signal which may contain a jamming signal,
   a plurality of signal processor means coupled to receive the signal from said receiver means, each said signal processor being adapted to analyze said signal to detect a respective one of the following signal signature information
   1) amplitude,
   2) time,
   3) frequency,
   and make a record thereof in the absence of jamming, microprocessor means connected to each of said signal processor means and adapted to compare said record with current received waveform signals, and characterize the type of interference present according to detected variations in:
   1) amplitude, and/or
   2) time, and/or
   3) frequency.

2. The interference detection and characterization system defined in claim 1 wherein said receiver means includes a charge coupled device chip matched filter.

3. The interference detection and characterization system defined in claim 1 including display means for displaying said signature information.

4. The interference detection and characterization system defined in claim 2 including means for adjusting the tap weight of said charge coupled device chip matched filter.

5. An interference detection system comprising:

radio receiver means for down-converting, demodulating and synchronizing a received waveform to produce signals which may contain an interfering signal, said radio receiver means including a charge coupled signal device means for producing a pair of phase displaced signals, a pair of analog-to-digital converters, one for each of said phase displaced signals, signal processor means coupled to receive the respective signals from said analog-to-digital converter means, said signal processor being adapted to analyze said signal to detect a respective one of the following signal signature information
1) amplitude,
2) time,
3) frequency,
and make a record thereof in the absence of an interfering signal, and means connected to said signal processor means and adapted to compare said record with current received waveform signals, and characterize the type of interference present according to detected variations in:
1) amplitude, and/or
2) time, and/or
3) frequency
above a predetermined level.

6. The invention defined in claim 5 including means to store the data from each of said analog-to-digital converter and wherein said signal processor means is comprised of a microprocessor programmed to analyze said signals.

7. The interference detection and characterization system defined in claim 5 including display means for displaying said signature information.

8. The interference detection and characterization system defined in claim 7 including means for adjusting the tap weights of said charge coupled signal device means.

9. A method of detecting and indicating radio interference comprising:

providing a radio receiver means for down converting, demodulating and synchronizing a received waveform to produce a received signal which may contain a jamming signal, analyzing said received signal to detect, in the absence of jamming each of the following signal signature information:
1) amplitude,
2) time,
3) frequency,
making a record of each detected signal information,
comparing each said record with current received waveform signals, and characterizing the type of interference present according to detected variations in:
1) amplitude, and/or
2) time, and/or
3) frequency, and
above a predetermined level, respectively, and indicating which of said detected variations are above said predetermined level.

10. The method defined in claim 9 including displaying said signature information which is above said predetermined level for each of said detected variations.

11. An interference detection method comprising:

providing a radio receiver means for down converting, demodulating and synchronizing a received waveform to produce signals which may contain an interfering signal, said radio receiver means including a charge coupled device matched filter means for producing a pair of phase displaced signals, a pair of analog-to-digital converters, one for each of said phase displaced signals, analyzing said signal to detect respective one of the following signal signature information
1) amplitude,
2) time,
3) frequency,
making a record of each detected signal signature information, and
comparing said record with current received waveform signals, and
characterizing the type of interference present according to detected variations in:
1) amplitude, and/or
2) time, and/or
3) frequency
above a predetermined level.

12. The interference detection and characterization method defined in claim 11 including displaying said signature information.

* * * * *